Jan. 17, 1933.  W. P. SCHMITTER  1,894,927
GEAR SET
Filed Sept. 14, 1929   3 Sheets-Sheet 1

Inventor
Walter P. Schmitter
By Ralph…
Attorney

Jan. 17, 1933.  W. P. SCHMITTER  1,894,927
GEAR SET
Filed Sept. 14, 1929   3 Sheets-Sheet 3
*Fig. 3*
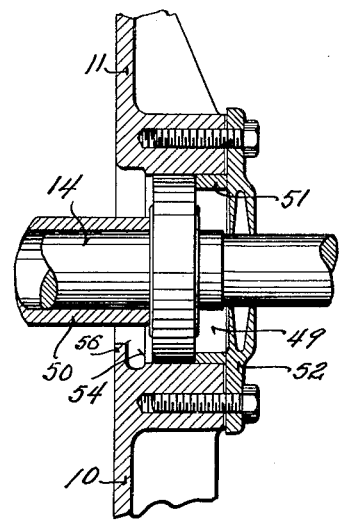
*Fig. 4*
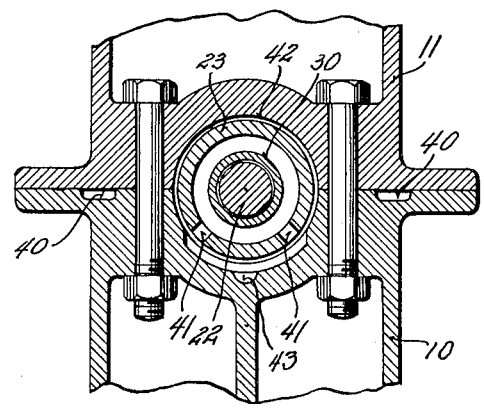
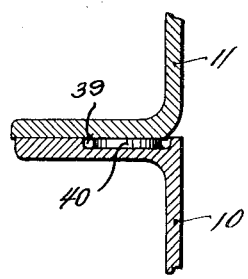
*Fig. 5*
Inventor
Walter P. Schmitter
By
Attorney Patented Jan. 17, 1933

1,894,927

UNITED STATES PATENT OFFICE

WALTER P. SCHMITTER, OF MILWAUKEE, WISCONSIN, ASSIGNOR TO THE FALK CORPORATION, OF MILWAUKEE, WISCONSIN, A CORPORATION OF WISCONSIN

GEAR SET

Application filed September 14, 1929. Serial No. 392,501.

This invention relates to gear sets commonly known as speed reducers for use primarily in converting high speed rotation into rotation at low or moderate speed, although sometimes used to effect high speed rotation of a driven part from a slow speed driver.

Such devices are in general use throughout the industrial arts as a power transmitting unit between a high speed driver, such as an electric motor or steam turbine, and the apparatus to be driven. A common type of speed reducer, involving parallel driving and driven shafts connected through a single, double, or triple reduction gear train, satisfies the requirements of a majority of installations, and the efficiency of modern speed reducers of that type is commonly as high as 97%. In many instances however the installation requires a type of speed reducer with the drive shaft disposed at right angles to the driven shaft. But much difficulty has been experienced in devising a satisfactory speed reducer of the latter type which will operate smoothly and quietly and with an efficiency approaching that of the parallel drive type.

One object of the present invention is the provision of an entirely satisfactory speed reducer of the right-angle-drive type which will operate smoothly and quietly and with an efficiency approximating that of the parallel-drive type.

A more specific object is the provision of an improved mounting for the high speed pinion which will afford ready axial adjustment thereof into proper relation with the mating gear and accurately maintain that relation throughout long periods of service.

Another object is the provision in a speed reducer of a novel combination of parts which may be readily re-arranged to effect rotation of the driven shaft in either direction for a given direction of rotation of the drive shaft and thus render the same conformable to the peculiar requirements of a given installation. This ability to re-arrange the parts may also be utilized to compensate for wear.

Another object is the provision of an improved lubricating system for speed reducers of the character mentioned.

Other objects and advantages will appear from the following description of an illustrative embodiment of the present invention.

For purposes of explanation and illustration the invention is shown and will be described as a double reduction speed reducer of the right-angle drive type although certain novel features thereof may be applied with equal advantage to single or triple reduction reducers and to those of the parallel type.

In the accompanying drawings:—

Fig. 3 is a fragmentary sectional view on the line 3—3 of Fig. 1.

Fig. 4 is a fragmentary sectional view on the line 4—4 of Fig. 2.

Fig. 5 is a fragmentary sectional view on the line 5—5 of Fig. 1.

Figure 1:
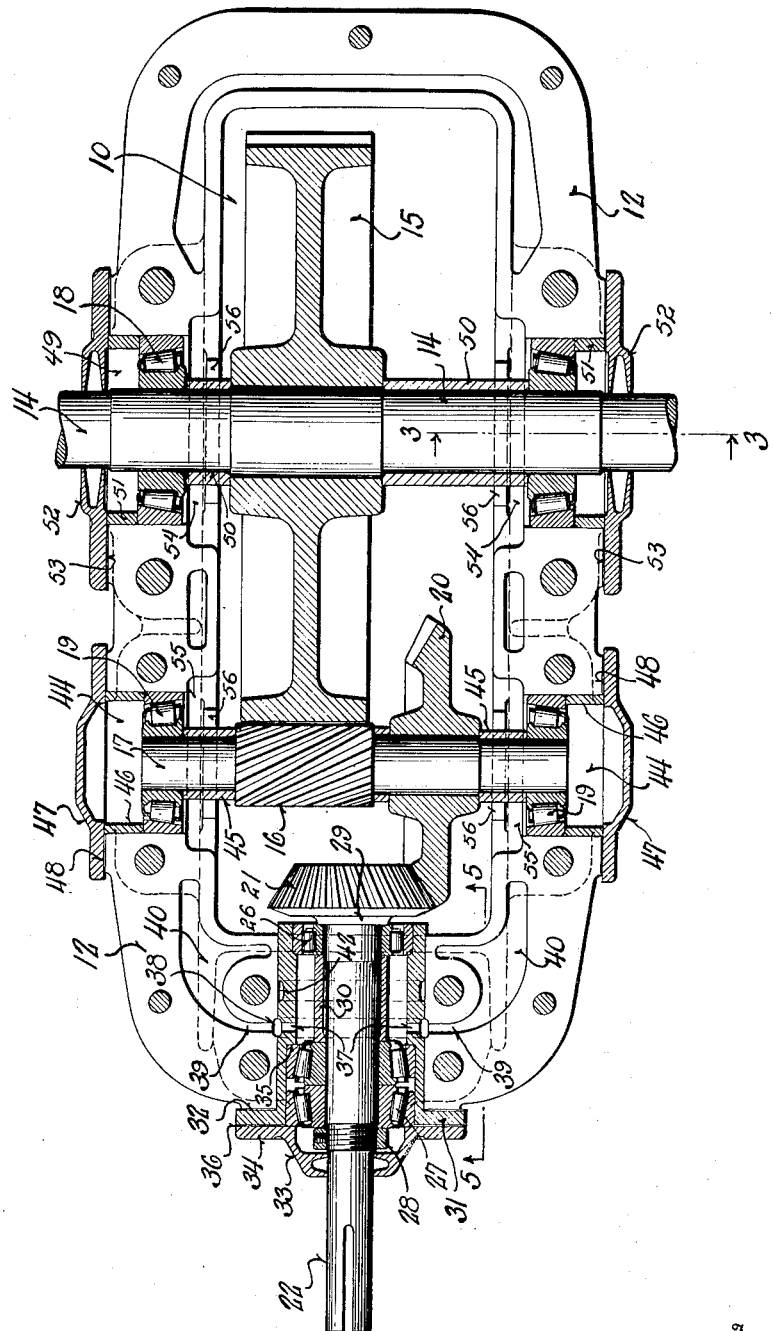
Figure 1 is a horizontal sectional view, taken along the line 1—1 of Fig. 2, of a speed reducer constructed in accordance with the present invention.

The speed reducer shown is contained within an appropriate housing which is horizontally split into a bottom portion 10 and cover portion 11, the bottom portion having a wide faced flange 12 formed on the upstanding rim thereof to receive a corresponding flange 12' on the cover portion. The bottom portion 10 forms a reservoir for lubricating oil and the base 13 thereof is suitably fashioned for anchorage to an appropriate foundation or other support.

A low speed shaft 14 is journaled in the housing between the bottom and cover portions thereof. This shaft carries a large gear 15 fixed thereto and meshing with a pinion 16 formed on an intermediate shaft 17 which is also journaled in and between the bottom and cover portions of the housing. Shafts 14 and 17 are parallel and both are supported in anti-friction bearings 18 and 19, respectively, preferably of a tapered roller type of well known construction capable of sustaining the radial thrust as well as the end thrust of the shafts. Shaft 17 also carries a bevel gear 20 fixed thereto and meshing with a bevel pinion 21 fixed to the inner end of a high speed shaft 22 journaled in and between the bottom and cover portions of the housing at one end thereof. Shaft 22 is arranged at right angles to shafts 14 and 17 and is preferably symmetrically disposed within the central longitudinal plane of the housing, so that upon reversing the shafts 14 and 17 end for end the bevel gear 20 may be made to mesh with the opposite side of the bevel pinion 21 to thereby reverse the direction of rotation of shafts 14 and 17 with respect to the shaft 22. This possibility of thus rearranging the parts is not only advantageous in meeting varied installation requirements but in redistributing the stresses so as to relieve parts that have been affected by wear.

The high speed shaft 22 is so mounted as to permit axial adjustment thereof to effect and maintain a proper working relation between the bevel pinion 21 and gear 20. For this purpose this shaft is supported within a sleeve 23 snugly fitted within mating semi-cylindrical portions 24 and 24' formed at the ends of the bottom and cover portions of the housing. Vertical external webs 25 and 25' on the housing support and rigidify these semi-cylindrical portions. The inner end of the shaft 22 is supported within a roller bearing 26 seated in the inner end of the sleeve 23, and the outer end of the shaft is supported within a pair of tapered roller bearings 27 seated in the outer end of the sleeve. The inner race rings of the several roller bearings are confined on the shaft betwen a nut 28 thereon and the hub 29 of the pinion 21, a spacer sleeve 30 being positioned between the bearing 26 and bearings 27 to maintain them in proper relation. The sleeve 23 is fixed in place by an external end flange 31 which is clamped to the housing, shims 32 being inserted beneath this flange to position the sleeve, shaft 22, and pinion 21. The outer end of the sleeve 23 is closed by a cover 33 having an attaching flange 34 applied over the flange 31. The outer race rings of the bearings 27 are confined between an internal shoulder 35 in the sleeve 23 and the cover 33, and by the use of replaceable shims 36 between the flanges 31 and 34 the bearings 27 may be adjusted to compensate for wear without disturbing the position of the shaft 22 and pinion. These bearings function in a well kown manner to sustain the radial thrust as well as the end thrust of the shaft 22 in both directions.

Bearings 26 and 27 are lubricated by a bath of oil maintained within the lower portion of the sleeve 23, as indicated in Fig. 4. This oil is supplied through ports 37 in the sleeve (Fig. 1) which communicate with an annular channel 38 encircling the sleeve, the channel 38 being supplied with oil through ducts 39 leading from wells or pockets 40 formed in the flange 12 on the bottom half of the housing. As indicated in Fig. 5 the interior of the cover 11 of the housing is so shaped that oil splashed thereon by the gears drains therefrom into the wells 40. Overflow ports 41 (Fig. 4) in the sleeve 23 determine the oil level therein. These ports communicate with an annular channel 42 which communicates with a drain passage 43 (Fig. 2) which discharges with the bottom of the housing.

The bearings 19 of shaft 17 are seated in circular openings 44 in the sides of the housing formed by mating semi-circular openings in the bottom and cover portions thereof. The inner race rings of the bearings are positioned on the shaft by spacer sleeves 45 and the outer race rings are positioned in the openings 44 by spacer sleeves 46 which bear against appropriate covers 47, bolted to the sides of the housing. By the use of replaceable shims 48 beneath the covers 47 the shaft 17 may be accurately positioned to insure proper meshing relation between the gear 20 and pinion 21, and the bearings may be adjusted to compensate for wear.

The bearings 18 of shaft 14 are seated within similar circular openings 49 and are similarly positioned by and between spacer sleeves 50 on the shaft and spacer sleeves 51 which bear against appropriate covers 52 bolted to the sides of the housing with shims 53 thereunder.

Both sets of bearings 18 and 19 are lubricated by baths of oil maintained within circular recesses 54 and 55 formed in the inner wall of the housing and concentrically disposed with respect to the openings 49 and 44, respectively. These recesses are supplied with oil by drainage from the cover portion of the housing and from the shafting. A dam 56 extending across the open face of each recess at the bottom thereof determines the level of the oil therein (Fig. 3).

Figure 2:
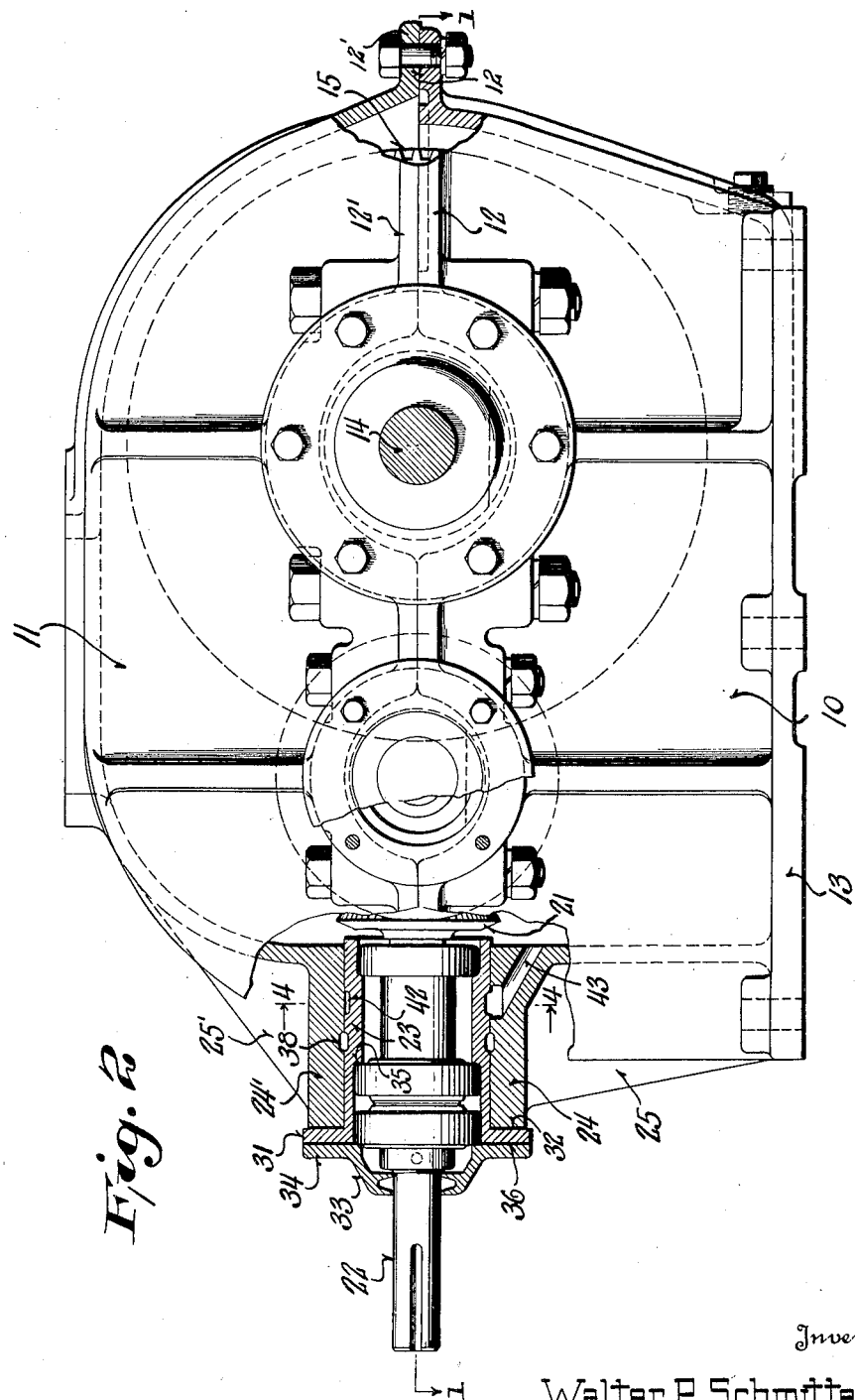
Fig. 2 is a side elevation partly in section.

The bevel pinion 21 and bevel gear 20 are preferably of the spiral type, as indicated in Fig. 1, to insure a smooth gear action. The pinion 16 and gear 15 are preferably of the single-helical type for a similar purpose. By the use of this particular combination however it will be noted that the end thrust imposed on shaft 17 by the reaction between the pinion 21 and gear 20 may be opposed and counteracted by the end thrust imposed on shaft 17 by the reaction between the helical pinion 16 and gear 15. The end thrust on the bearings 19 is thus greatly reduced so that these bearings are better able to withstand the heavy radial loads to which they are subjected.

Various changes may be made in the embodiment of the invention hereinabove specifically described without departing from or sacrificing the advantages of the invention as defined in the appended claims.

I claim:—

1. In a speed reducer the combination of a housing, a driving shaft journaled therein, a spiral bevel pinion on said shaft, a second shaft journaled in said housing, a spiral bevel gear on said second shaft meshing with and driven by said pinion and imposing an end thrust on said second shaft, a third shaft journaled in said housing, a single-helical gear on said third shaft, and a single-helical pinion on said second shaft meshing with and driven by said single-helical gear and imposing an end thrust on said second shaft opposed to the end thrust imposed by said bevel gear.

2. In a speed reducer the combination of a housing, a driving shaft journaled therein, a bevel pinion on said shaft, a second shaft journaled in said housing, a bevel gear on said second shaft meshing with and driven by said pinion and imposing an end thrust on said second shaft, a third shaft journaled in said housing, a single-helical gear on said third shaft, and a single-helical pinion on said second shaft meshing with and driven by said single-helical gear and imposing an end thrust on said second shaft opposed to the end thrust imposed by said bevel gear.

3. In a speed reducer the combination of a housing, a driving shaft journaled therein, a spiral bevel pinion on said shaft, a second shaft journaled in said housing at right angles to said first named shaft, a spiral bevel gear on said second shaft meshing with and driven by said spiral bevel pinion, a single-helical gear on said second shaft, a third shaft journaled in said housing parallel to said second shaft, and a single-helical gear on said third shaft meshing with and driven by said single-helical pinion.

4. In a speed reducer the combination of a housing longitudinally split into a bottom portion and cover portion, a driving shaft journaled in said housing between said bottom and cover portions, a spiral bevel pinion on said shaft, a second shaft journaled in said housing between said bottom and cover portions, said second shaft being coplanar with said first named shaft and disposed at right angles thereto, a spiral bevel gear meshing with and driven by said spiral bevel pinion, a single-helical pinion on said second shaft, a third shaft journaled in said housing between said bottom and cover portions, said third shaft being coplanar with said first and second shafts and parallel to said second shaft, and a single-helical gear on said third shaft meshing with and driven by said single-helical pinion.

5. In a speed reducer the combination of a housing, a driving shaft journaled in one end thereof, combined end and radial thrust anti-friction bearings for said shaft, a spiral bevel pinion on the inner end of said shaft, a second shaft journaled in said housing and extending transversely thereof at right angles to said first-named shaft, combined end and radial thrust anti-friction bearings for supporting the opposite ends of said second shaft, a spiral bevel gear on said second shaft intermediate the ends thereof and meshing with and driven by said spiral bevel pinion, a single-helical pinion on said second shaft beside said gear, a third shaft journaled in said housing and extending transversely thereof parallel to said second shaft, combined end and radial thrust anti-friction bearings for supporting the opposite ends of said third shaft, and a single-helical gear on said third shaft meshing with and driven by said single-helical pinion.

6. In a speed reducer the combination of a housing having an elongated bearing support at one end thereof, a driving shaft journaled therein, spaced anti-friction bearings in the opposite ends of said support for supporting said shaft, a bevel pinion on the inner end of said shaft adjacent one of said bearings, a second shaft journaled in said housing at right angles to said first named shaft, a bevel gear on said second shaft meshing with and driven by said pinion, a single-helical pinion on said second shaft, a third shaft journaled in said housing parallel to said second shaft, and a single-helical gear on said third shaft meshing with and driven by said single-helical pinion.

7. In a speed reducer the combination of a housing, a shaft journaled in one end thereof, a bevel pinion on said shaft, a second shaft journaled in said housing at right angles to said first named shaft, a bevel gear on said second shaft, meshing with one side of said bevel pinion, a pinion on said second shaft, a third shaft journaled in said casing parallel to said second shaft, and a gear on said third shaft meshing with the pinion on said second shaft, bearings in the opposite sides of said housing for supporting each of said second and third named shafts, said first named shaft being symmetrically disposed with respect to said second and third shafts so that upon reversal thereof said bevel gear meshes with the other side of said bevel pinion to thereby reverse the direction of rotation of said second and third shafts relative to said first named shaft.

8. In a speed reducer the combination of a housing, a driving shaft journaled therein, a bevel pinion on said shaft, a second shaft journaled at both ends in said housing at a right angle to said first named shaft, a bevel gear intermediate the ends of said second shaft meshing with and driven by said pinion, a single-helical gear on said second shaft beside said gear, a third shaft journaled in said housing parallel to said second shaft, and a single-helical gear on said third shaft meshing with and driven by said single-helical pinion.

In witness whereof, I hereunto subscribe my name this 10th day of September, 1929.

WALTER P. SCHMITTER.